United States Patent [19]

Bennett et al.

[11] Patent Number: 5,556,049
[45] Date of Patent: Sep. 17, 1996

[54] ANTI-REVERSE FISHING REEL WITH DRAG CONTROL AND REPLACEABLE SPOOL

[75] Inventors: M. Dickson Bennett, Norwalk; Glenn Holcomb, Newtown, both of Conn.

[73] Assignee: Dickson Product Development, Inc., Norwalk, Conn.

[21] Appl. No.: 255,063

[22] Filed: Jun. 7, 1994

[51] Int. Cl.⁶ .......................... A01K 89/016; A01K 89/033
[52] U.S. Cl. ........................ 242/295; 242/303; 242/318
[58] Field of Search ................................ 242/303, 295, 242/285, 317, 318, 270

[56] References Cited

U.S. PATENT DOCUMENTS

| | | | |
|---|---|---|---|
| 2,269,808 | 1/1942 | Cabassa | 242/317 |
| 2,531,816 | 11/1950 | Homoky . | |
| 2,553,784 | 5/1951 | Parks . | |
| 2,561,935 | 7/1951 | McCash . | |
| 2,656,992 | 10/1953 | Keates . | |
| 2,765,990 | 10/1956 | Engel | 242/270 |
| 3,526,370 | 9/1970 | Arsenault . | |
| 3,572,607 | 3/1971 | Wilson | 242/318 |
| 3,697,012 | 10/1972 | Walker | 242/295 |
| 3,779,477 | 12/1973 | Humble . | |
| 3,806,060 | 4/1974 | Valentine . | |
| 3,870,245 | 3/1975 | Witteborg, Jr. . | |
| 4,515,325 | 5/1985 | Ito . | |
| 4,715,555 | 12/1987 | McChristian, Jr. | 242/295 |
| 4,728,054 | 3/1988 | Pisapio | 242/317 |
| 4,733,830 | 3/1988 | Hollander . | |
| 4,883,238 | 11/1989 | Harder . | |
| 5,199,682 | 4/1993 | James | 242/295 |

Primary Examiner—Katherine Matecki
Attorney, Agent, or Firm—Barry R. Lipsitz

[57] ABSTRACT

An anti-reverse fishing reel includes a housing with an arbor extending therefrom. A crank assembly has a crank arm with an extending shaft. A hollow core of the shaft is adapted to be rotatably and detachably mounted on the arbor. A spool is rotatably and detachably mounted on the shaft, and includes a hub for holding fishing line. A drag control is mounted on the shaft of the crank assembly, and is disposed between the crank arm and the spool when the spool is mounted on the shaft. An anti-reverse feature is provided by mounting the shaft on the arbor via a one-way clutch. A clicker assembly is provided in the spool to provide a clicking sound when fishing line is withdrawn from the reel. A latch is mounted to the crank arm for releasably engaging a terminal end of the arbor. The latch releasably secures the shaft to the arbor and thereby releasably secures the spool on the shaft within the housing.

20 Claims, 3 Drawing Sheets

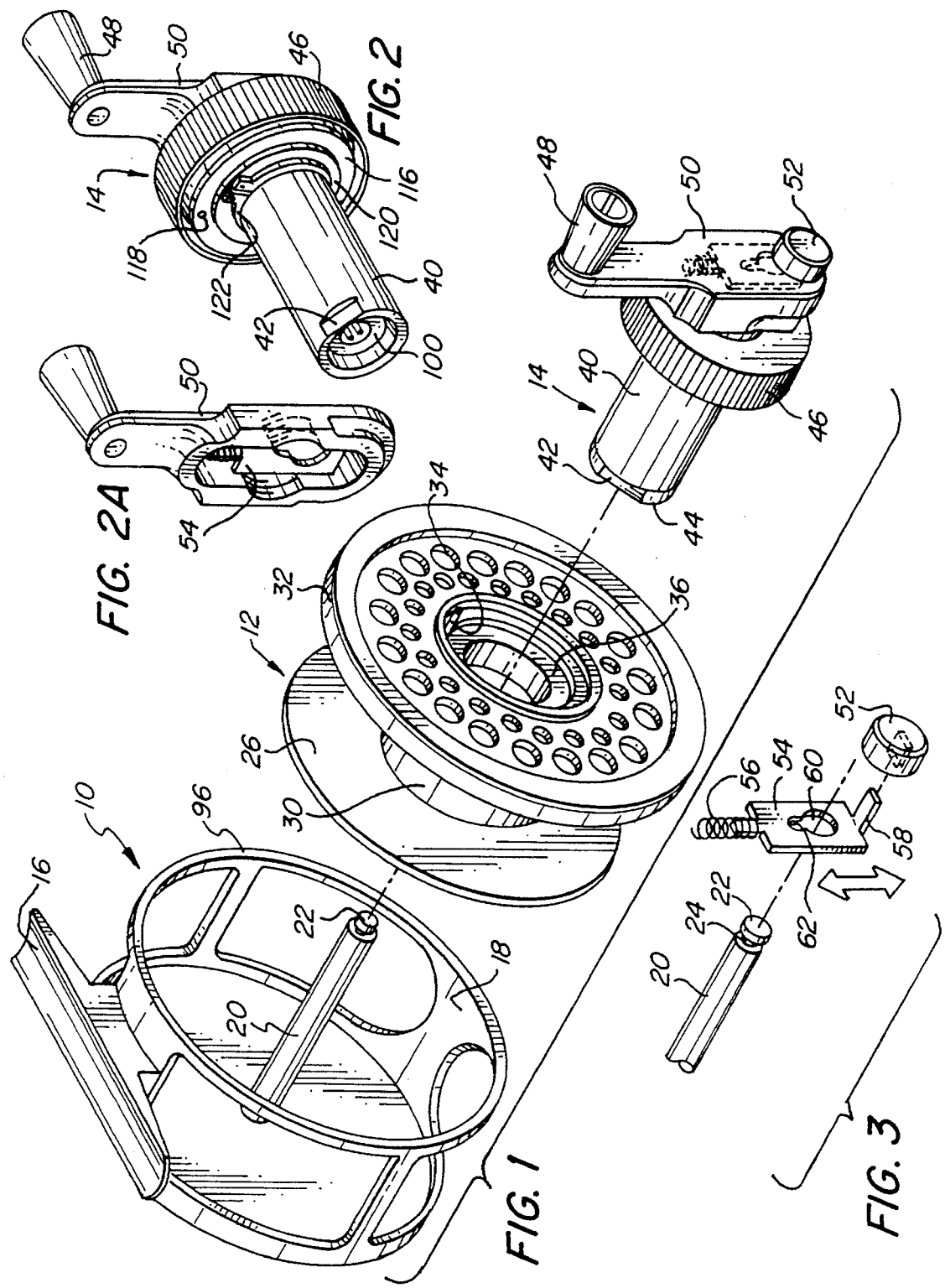

ANTI-REVERSE FISHING REEL WITH DRAG CONTROL AND REPLACEABLE SPOOL

BACKGROUND OF THE INVENTION

The present invention relates to fishing reels, and more particularly to an anti-reverse fly fishing reel having a replaceable spool and a drag control mechanism mounted on a releasable crank assembly.

One type of fishing enjoyed by many people is fly fishing. In fly fishing, a lure known as a "fly" is attached to a line controlled by a fishing rod and reel. The fly fisherman casts the line and fly in a manner which delivers the fly to a selected location. Many fly fishermen become quite proficient at delivering a fly with accuracy to a desired location on the surface of a body of water, with an impact force that closely resembles that of a particular insect on that body of water.

Fly fishing equipment is often very sophisticated. Fly rods are made of bamboo, light weight composites and other materials which have specific flex characteristics that may vary over the length of the rod in accordance with patterns which aid casting. Fly lines generally comprise a length of relatively thin backing line, a taper section, a heavier leader and a tippet which facilitate the whipping out of the fly for presentation on the surface of the water. Each section of the line is manufactured with special characteristics to aid in the casting of the fly.

Fly reels have also developed into precision instruments. Such reels generally comprise a frame which is fixed to the fly rod and which supports a spindle, and a spool comprising a hub and two side walls. The spool may be releasably retained on the spindle which extends from the frame. The spool holds the line being used. Spools are often equipped with a counterweight and handle or other means of being rotated so that following a cast, a fly fisherman may retrieve his line and fly in a controlled manner. Additional controls may be included on a fly reel to aid in the control of the line. It is advantageous to fabricate the reels of high quality materials, such as aluminum alloy, which are precisely fitted to provide a smooth, well balanced mechanism.

Examples of prior art fishing reels can be found in U.S. Pat. Nos. 3,526,370 to Arsenault, 3,779,477 to Humble, 3,806,060 to Valentine, 4,515,325 to Ito, and 4,883,238 to Harder. The Arsenault patent discloses a fishing reel with an automatic drag brake. The provision of drag on the line enables the fisherman to control the rate at which a fish will pull the line off of the spool. The proper amount of drag will also prevent backlash and facilitate the effectiveness of the fisherman in "playing the fish."

Prior art drag mechanisms have been complicated and relatively difficult to adjust in order to apply the desired amount of drag. Typically, adjustable drag mechanisms have been located on the opposite side of the spool as the crank handle, requiring the fisherman to use different hands to retrieve the line and adjust the drag mechanism.

If the drag is not properly set, i.e., to less than the breaking strength of the line, a fish may snap the line. It is also desirable for the drag mechanism to provide the same breaking friction as running friction. In other words, the amount of force required to start the feeding of the line from the spool ("static friction") should approximately equal the amount of force required to continue to pull the line from the spool ("dynamic friction"). It would be advantageous to provide a fly fishing reel having a drag control that is adjustable on the same side of the reel as the crank, and which has comparable breaking and running friction.

It would be further advantageous to provide an anti-reverse fly fishing reel in which the crank can only be turned in one direction. Specifically, the crank should be able to be rotated in a direction necessary to wind the line back onto the spool. In such an anti-reverse reel, the crank would not turn when line is being withdrawn from the spool, e.g., by a fish.

It would be still further advantageous to provide a fly fishing reel assembly in which the crank, drag mechanism and spool are all easily removable from the housing or frame. Such a structure should allow spools to be easily interchanged with different spools carrying lines having different properties.

The present invention provides an anti-reverse fly fishing reel having the aforementioned and other advantages.

SUMMARY OF THE INVENTION

A fishing reel in accordance with the present invention comprises a housing having an arbor extending therefrom. A crank assembly has a crank arm with a shaft extending therefrom. The shaft has a hollow core adapted to be rotatably and detachably mounted on the arbor. A spool is adapted to be rotatably and detachably mounted on the shaft. The spool includes a hub for holding fishing line.

A drag control may be mounted on the shaft. The drag control is disposed between the crank arm and the spool when the spool is mounted on the crank assembly shaft. The drag control can comprise a knob threadedly mounted on the shaft. As the knob is screwed toward the spool, it applies increasing force against a pressure disk that engages the spool. In a preferred embodiment, the pressure disk engages the spool via a pin.

In order to provide an anti-reverse function, the shaft can be rotatably mounted on the arbor via a one-way clutch. The clutch restricts the crank assembly to rotation on the arbor in only one direction. Since the spool is mounted on the shaft and not on the arbor, it can be rotated in two directions even though the crank assembly is rotatable in only one direction.

A spool for use in the fishing reel of the present invention can comprise a pair of parallel disks with the hub located centrally therebetween. One of the disks engages the pressure disk of the drag control, e.g., via the pin. A clicker assembly is mounted to the other one of the disks. A terminal end of the crank assembly shaft engages the clicker assembly to cause a clicking sound when the crank assembly is rotated with respect to the spool. When a one-way clutch is used to provide an anti-reverse function, the clicking sound will occur only when the crank assembly is rotated in the one direction it is permitted to rotate with respect to the spool. The clicking sound will not be made when the crank assembly and spool are rotating together.

The fishing reel can further comprise a latch mounted to the crank arm for releasably engaging a terminal end of the arbor. The latch releasably secures the shaft to the arbor and thereby releasably secures the spool on the shaft within the housing.

BRIEF DESCRIPTION OF THE DRAWINGS

FIG. 1 is a perspective, exploded view of a fishing reel in accordance with the present invention;

FIG. 2 is a perspective view of the crank assembly;

FIG. 2a is a perspective view of the crank arm which is attached to the crank assembly of FIG. 2;

FIG. 3 is a perspective, exploded view of the latch mechanism and terminal end of the arbor to which it latches;

DETAILED DESCRIPTION OF THE INVENTION

Figure 6:
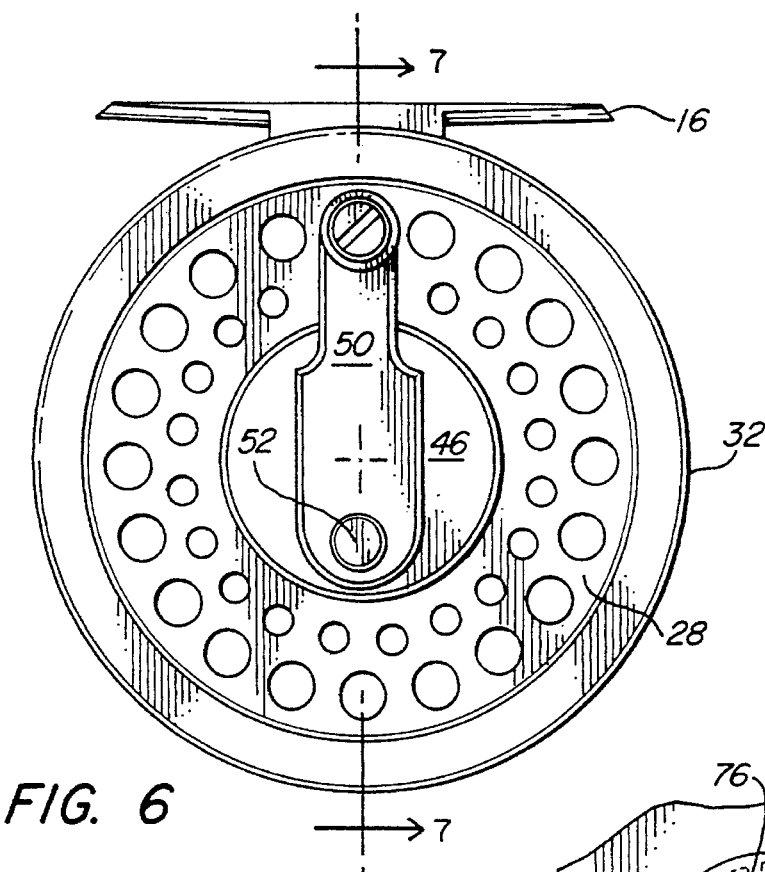
FIG. 6 is a side plan view of the fishing reel.

The fishing reel of the present invention comprises a housing generally designated 10, a spool generally designated 12 and a crank assembly generally designated 14. Housing 10 includes a frame 18 and mounting base 16 which is used to mount the fishing reel on a fishing rod in a conventional manner. An arbor 20 extends from the housing and is affixed to frame 18 via a screw 102 illustrated in FIG. 7.

Spool 12 includes first and second parallel disks 26, 28 with a hub 30 therebetween. Hub 30 is designed to carry fishing line including backing 92 and fly line 90 in a conventional manner, also illustrated in FIG. 7. First and second bushings 36, 104 are carried inside hub 30 and are designed to ride on a hollow shaft 40 extending from crank assembly 14. Disk 28 of spool 12 has a rim 32 that includes a channel 94 which is adapted to ride along the edge 96 of frame 18, as best illustrated in the cross-sectional view of FIG. 7.

A pin 34 extending from spool 12 is adapted to engage with a hole 118 provided in a drag pressure disk 116 of a drag control that is carried by crank assembly 14. The crank assembly includes a handle or crank arm 50 and finger grip 48 that allow the spool to be cranked in order to retrieve the fishing line. Hollow shaft 40 extends from the crank arm 50 via threads 124 and is adapted to be rotatably and detachably mounted on the arbor 20 extending from frame 18 of housing 10. At the same time, spool 12 is adapted to be rotatably and detachably mounted on shaft 40, with bushings 36 and 104 of the spool riding on shaft 40. When the crank assembly 14 is mounted on arbor 20 with the spool 12 riding on shaft 40, a spring loaded retaining clip 54 holds the subassemblies together. In particular, and as best illustrated in FIG. 3, retaining clip 54 is spring loaded by spring 56 into a position where slot 62 of key hole 60 will mate with groove 24 in the terminal end 22 of arbor 20, thereby latching the crank assembly 14 on arbor 20. An actuator button 52 mounted on tab 58 of retaining clip 54 enables a fisherman to slide the retaining clip against the force of spring 56, thereby releasing the crank assembly and the spool carried thereon from the housing 10.

Figure 5:
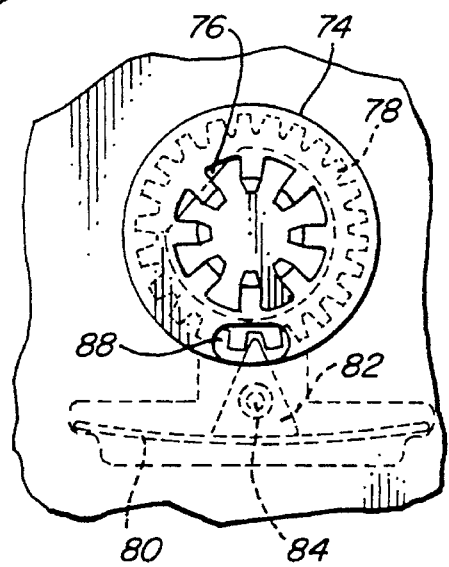
FIG. 5 is a partial view of the spool assembly illustrating the clicker mechanism.
Figure 4:
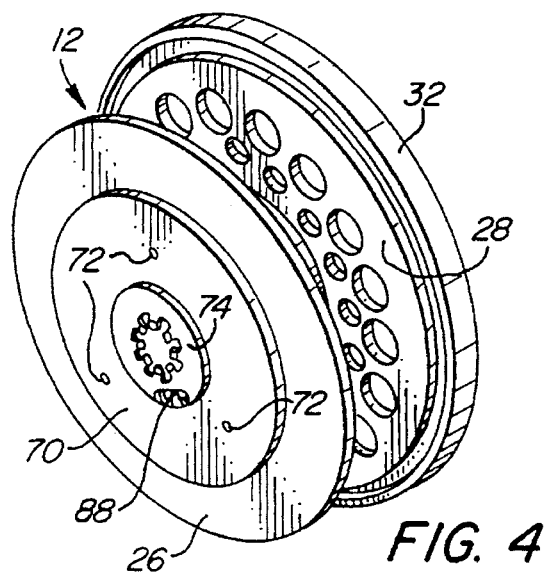
FIG. 4 is a perspective view of the spool.
Figure 7:
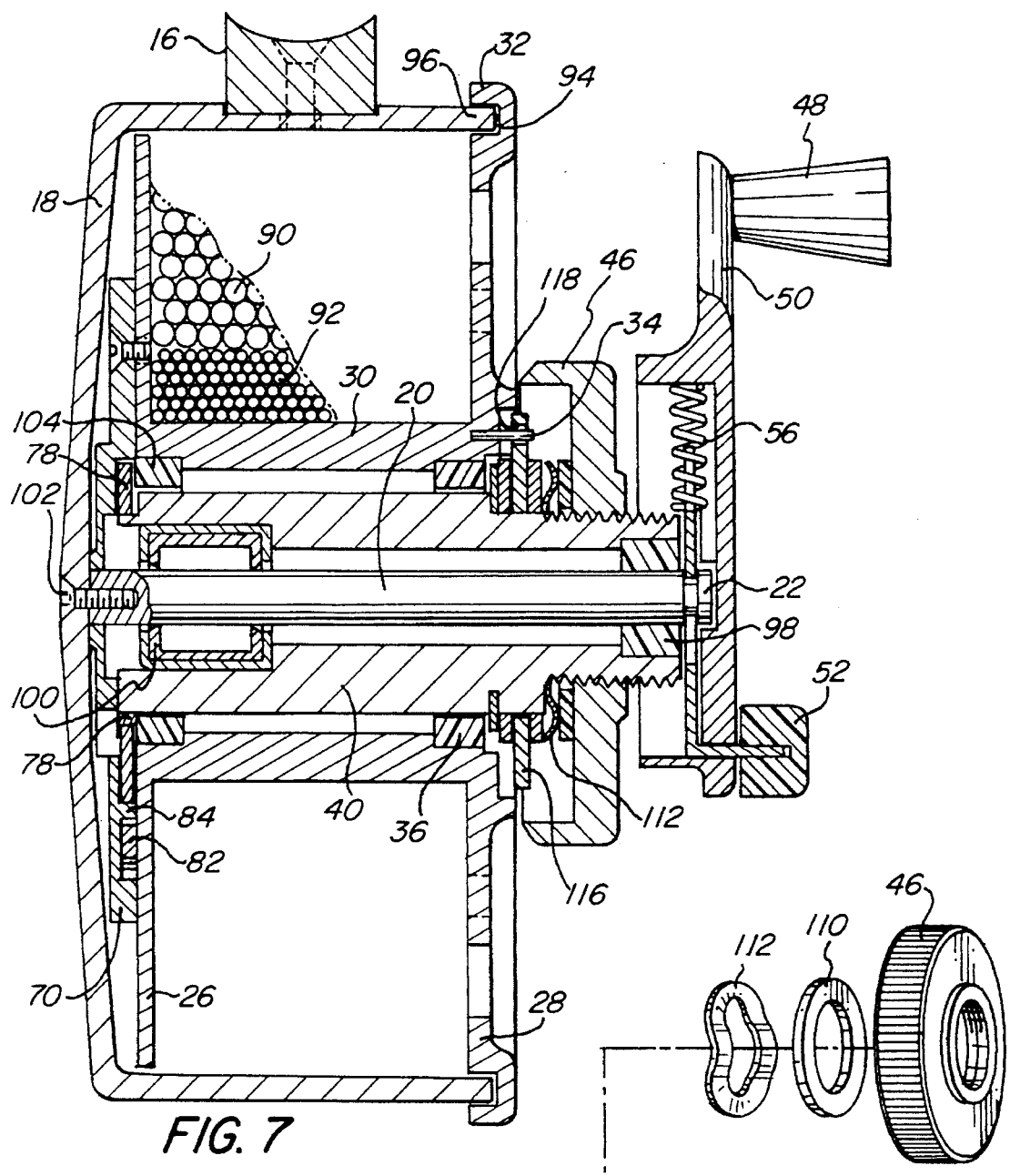
FIG. 7 is a cross-sectional view of the fishing reel taken along the lines 7—7 of FIG. 6.

A clicker mechanism 70 is mounted to disk 26 of spool 12 as best illustrated in FIGS. 4, 5 and 7. The clicker assembly is mounted to disk 26 via screws 72. A central portion 74 of the clicker mechanism retains a clicker wheel 78 in coaxial arrangement with the hub 30. Clicker wheel 78 has a flat 76 that is adapted to mate with a corresponding flat 42 on the terminal end 44 of crank assembly shaft 40. When flats 76 and 42 are mated, the rotation of crank assembly 14 will rotate clicker wheel 78, which has teeth that engage clicker pawl 82. Pawl 82 is spring loaded toward the clicker wheel 78 via a leaf spring 80. The pawl rides on a pin 84 that extends from the clicker assembly 70. A window 88 in the clicker assembly facilitates the propagation of the clicking sound from the reel.

Figure 8:
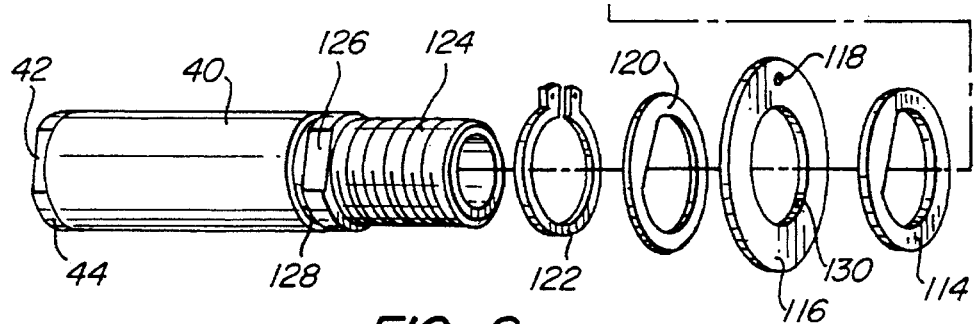
FIG. 8 is a perspective, exploded view of the drag control mechanism of the present invention.

Hollow shaft 40 of crank assembly 14 carries an interior one-way clutch 100 which can comprise, for example, a one-way roller bearing or "roller clutch" of the type commercially available, e.g., from W. M. Berg, Inc. of E. Rockaway, N.Y. This roller clutch rides on arbor 20, and allows the crank assembly to be turned only in a clockwise direction. Thus, an anti-reverse feature is provided wherein the crank arm 50 will not rotate in a counter-clockwise direction as line is being withdrawn from the spool. Also riding on arbor 20 is bushing 98 that resides in hollow shaft 40 at an end opposite to that which carries one-way clutch 100, as shown in FIG. 7. The amount of drag force on the spool is controlled by screwing a knob 46, which is preferably knurled as shown, toward or away from terminal end 44 of shaft 40. The assembly of the drag control can best be seen in the exploded view of FIG. 8. Knob 46 is threaded onto threads 124 of shaft 40. A pressure disk assembly is sandwiched between knob 46 and a retaining ring 122 that sits within a groove 128 of shaft 40. Pressure disk 116 rides between two drag pressure washers 114, 120. These washers each have a "D" shaped opening that is adapted to fit in a fixed manner on flat 126 of shaft 40. Pressure disk 116 has a circular opening 130 that allows the pressure disk to rotate on shaft 40. The assembly of pressure washer 114, pressure disk 116 and pressure washer 120 is maintained in a spring loaded condition by a wave spring 112 and spring washer 110 that bears against the interior wall of knob 46.

The spool is driven by the crank assembly via pressure disk 116 and pin 34. As best shown in FIG. 7, pin 34 projects from disk 28 of the spool and engages a hole 118 in pressure disk 116. The amount of drag on the spool is dependent on the force supplied to pressure disk 116 by the spring loading of pressure washers 114, 120 thereagainst by spring 112. This force will increase as knob 46 is screwed onto shaft 40 towards terminal end 44 of the shaft. As knob 46 is backed away from terminal end 44, the loading of pressure disk 116 will be reduced, and less drag will be transferred to the spool via the pressure disk 116 and pin 34.

It should now be appreciated that the present invention provides a unique fishing reel assembly having many advantages. Since the spool rotates on shaft 40 of crank assembly 14, and not directly on arbor 20, an anti-reverse feature can be provided via one-way roller clutch 100 which is coupled between the crank assembly and arbor 20. Further, the unique crank assembly enables drag control knob 46 to be provided on the same side of the reel as the handle 50. The provision of a clicker within the spool assembly 12, in combination with the anti-reverse feature, enables a clicking sound to be provided when line is being withdrawn by a fish, without any clicks when the line is being rewound on the spool using the crank.

Although the invention has been described in connection with various preferred embodiments thereof, it will be appreciated that numerous adaptations and modifications may be made thereto without departing from the spirit and scope thereof as set forth in the claims.

What is claimed is:

1. A fishing reel comprising:

a housing having an arbor extending therefrom;

a crank assembly having a crank arm with a shaft extending therefrom, said shaft having a hollow core adapted to be rotatably and detachably mounted on said arbor via a latch mounted to said crank arm for releasably engaging a terminal end of said arbor; and a spool adapted to be rotatably and detachably mounted on said shaft, said spool including a hub for holding fishing line;

wherein said latch releasably secures said shaft to said arbor and thereby releasably secures said spool on said shaft within said housing.

2. A fishing reel in accordance with claim 1 further comprising:

a drag control mounted on said shaft, said drag control being disposed between said crank arm and said spool when said spool is mounted on said shaft.

3. A fishing reel in accordance with claim 2 wherein said drag control comprises a knob threadedly mounted on said shaft to apply increasing force against a pressure disk that engages said spool as the knob is screwed toward said spool.

4. A fishing reel in accordance with claim 3 wherein said pressure disk engages said spool via a pin.

5. A fishing reel in accordance with claim 4 wherein said shaft is rotatably mounted on said arbor via a one-way clutch, whereby said crank assembly is rotatable on said arbor in only one direction while said spool is rotatable on said shaft in two directions.

6. A fishing reel in accordance with claim 5 wherein said spool comprises:

a pair of parallel disks with said hub located centrally therebetween, one of said disks engaging said pressure disk via said pin; and a clicker assembly mounted to the other one of said disks;

wherein a terminal end of said shaft engages said clicker assembly to cause a clicking sound when said crank assembly is rotated in said one direction with respect to said spool.

7. A fishing reel in accordance with claim 2 wherein said shaft is rotatably mounted on said arbor via a one-way clutch, whereby said crank assembly is rotatable on said arbor in only one direction while said spool is rotatable on said shaft in two directions.

8. A fishing reel in accordance with claim 1 wherein said shaft is rotatably mounted on said arbor via a one-way clutch, whereby said crank assembly is rotatable on said arbor in only one direction while said spool is rotatable on said shaft in two directions.

9. A fishing reel in accordance with claim 8 wherein said spool comprises:

a pair of parallel disks with said hub located centrally therebetween, one of said disks being adjacent said crank arm when said spool is mounted on said shaft; and a clicker assembly mounted to the other one of said disks;

wherein a terminal end of said shaft engages said clicker assembly to cause a clicking sound when said crank assembly is rotated in said one direction with respect to said spool.

10. A fishing reel in accordance with claim 1 wherein said spool comprises:

a pair of parallel disks with said hub located centrally therebetween, one of said disks being adjacent said crank arm when said spool is mounted on said shaft; and a clicker assembly mounted to the other one of said disks;

wherein a terminal end of said shaft engages said clicker assembly to cause a clicking sound when said crank assembly is rotated with respect to said spool.

11. A fishing reel in accordance with claim 10 further comprising:

a drag control mounted on said shaft, said drag control being disposed between said crank arm and said spool when said spool is mounted on said shaft.

12. A fishing reel in accordance with claim 11 wherein said drag control comprises a knob threadedly mounted on said shaft to apply increasing force against a pressure disk that engages said spool as the knob is screwed toward said spool.

13. A fishing reel in accordance with claim 12 wherein said pressure disk engages said spool via a pin.

14. A fishing reel comprising:

a housing having an arbor extending therefrom;

a crank assembly having a crank arm with a shaft extending therefrom, said shaft having a hollow core adapted to be rotatably and detachably mounted on said arbor;

a spool adapted to be rotatably and detachably mounted on said shaft, said spool including a hub for holding fishing line; and a one-way clutch mounted within said shaft and forming at least part of said hollow core, whereby said crank assembly is rotatable on said arbor in only one direction while said spool is rotatable on said shaft in two directions.

15. A fishing reel in accordance with claim 14 further comprising a latch mounted to said crank arm for releasably engaging a terminal to said crank arm for releasably engaging a terminal end of said arbor, whereby said latch releasably secures said shaft to said arbor and thereby releasably secures said spool on said shaft within said housing.

16. A fishing reel in accordance with claim 14 wherein said one-way clutch comprises a roller clutch.

17. A fishing reel in accordance with claim 14 wherein said spool comprises:

a pair of parallel disks with said hub located centrally therebetween, one of said disks engaging said pressure disk via said pin; and a clicker assembly mounted to the other one of said disks;

wherein a terminal end of said shaft engages said clicker assembly to cause a clicking sound when said crank assembly is rotated in said one direction with respect to said spool.

18. A fishing reel in accordance with claim 14 further comprising:

a drag control mounted on said shaft, said drag control being disposed between said crank arm and said spool when said spool is mounted on said shaft.

19. A fishing reel in accordance with claim 18 wherein said drag control comprises a knob threadedly mounted on said shaft to apply increasing force against a pressure disk as the knob is screwed toward said spool, said pressure disk engaging said spool via a pin.

20. A fishing reel comprising:

a housing having an arbor extending therefrom;

a crank assembly having a crank arm with a shaft extending therefrom, said shaft having a hollow core adapted to be rotatably and detachably mounted on said arbor;

a spool adapted to be rotatably and detachably mounted on said shaft, said spool including a hub for holding fishing line;

a drag control mounted on said shaft, said drag control being disposed between said crank arm and said spool when said spool is mounted on said shaft;

wherein said drag control comprises a knob threadedly mounted on said shaft to apply increasing force against a pressure disk as the knob is screwed toward said spool, said pressure disk engaging said spool via a pin.

* * * * *